United States Patent [19]

Kreuzer et al.

[11] 4,410,570

[45] Oct. 18, 1983

[54] COMPOSITIONS CONTAINING LIQUID-CRYSTALLINE PHASES

[75] Inventors: Franz-Heinrich Kreuzer, Martinsried; Magdi E. Gawhary, Munich, both of Fed. Rep. of Germany

[73] Assignee: Consortium für Elektrochemische Industrie GmbH, Munich, Fed. Rep. of Germany

[21] Appl. No.: 352,422

[22] Filed: Feb. 25, 1982

[30] Foreign Application Priority Data

Mar. 16, 1981 [DE] Fed. Rep. of Germany ....... 3110048

[51] Int. Cl.³ .............................................. B05D 3/02

[52] U.S. Cl. ............................. 427/374.1; 252/299.01; 252/299.6; 427/162; 427/163; 427/165; 427/314; 427/316; 427/331; 427/385.5; 427/387; 428/1; 525/475; 525/479

[58] Field of Search ........................ 252/299.01, 299.6; 428/1; 525/475, 479; 427/398.1, 385.5, 314, 162, 316, 163, 331, 165, 399, 374.1; 528/15

[56] References Cited

U.S. PATENT DOCUMENTS 4,358,391 11/1982 Finkelmann et al. .......... 252/299.01

*Primary Examiner*—Thurman K. Page

[57] ABSTRACT

This invention relates to compositions containing liquid-crystalline phases which comprises a cyclic organopolysiloxane having mesogenic molecules chemically bonded thereto.

7 Claims, No Drawings

COMPOSITIONS CONTAINING LIQUID-CRYSTALLINE PHASES

The present invention relates to compositions containing liquid-crystalline phases and more particularly to an organopolysiloxane composition containing liquid-crystalline phases in which one component of the composition consists of a cyclic organopolysiloxane having mesogenic molecules chemically bonded thereto as side chains.

BACKGROUND OF THE INVENTION

Liquids which under certain conditions have properties otherwise observed only with crystalline solids, such as optical anisotropy have been known for a long time. Likewise, compositions containing liquid-crystalline phases based on long-chained organopolysiloxanes having chemically bonded mesogenic groups have been described in German patent application No. 2,944,591 to Wacker Chemie GmbH. However, the conversion of long-chained organopolysiloxanes containing mesogenic groups into the liquid-crystalline state frequently presents difficulties, since prolonged heating or tempering times must be tolerated to reach a high degree of order. On the other hand, short-chained organopolysiloxanes having mesogenic groups actually do become oriented spontaneously, but they generally have undesirable adhesive properties.

Therefore, it is an object of this invention to provide compositions which have liquid-crystalline phases at relatively low temperatures. Another object of this invention is to prepare compositions having liquid-crystalline phases over a wide range of pressure and temperature. Still another object of this invention is to provide compositions having liquid-crystalline phases which can be tailored to the requirements of the particular application. A further object of this invention is to form compositions containing liquid-crystalline phases which are non-adhesive at ambient temperatures and after exceeding the glass transition temperature can be readily oriented; that is, converted into a liquid-crystalline state of high order.

SUMMARY OF THE INVENTION

The foregoing objects and others which will become apparent from the following description are accomplished in accordance with this invention, generally speaking, by providing compositions having liquid-crystalline phases in which at least one component consists of a cyclic organopolysiloxane having at least one mesogenic group chemically bonded thereto.

DETAILED DESCRIPTION OF THE INVENTION

The compositions of this invention which contain liquid-crystalline phases preferably consist of cyclic organopolysiloxanes having from 3 to 20, and more preferably from 4 to 7, silicon atoms in the ring.

Also, it is preferred that these compositions have nematic or cholesteric properties. Therefore, the compositions of this invention preferably contain cyclic organopolysiloxanes having nematic or cholesteric properties, cyclic organopolysiloxanes consisting of mixtures of nematic, mixtures of cholesteric and mixtures of nematic and cholesteric properties, and cyclic organopolysiloxanes which carry both nematogenic and cholesterogenic or chiral molecules in the same molecule as substituents.

If desired, the compositions of this invention can also contain organopolysiloxanes having straight-chained mesogenic groups.

Compositions based on cyclic organopolysiloxanes containing at least one mesogenic group having smectic or, for example, chiral properties are prepared by mixing at least one intrinsically nematic component with the smectic or chiral component. The fraction of the smectic and the chiral component normally does not exceed about 60 percent.

The compositions of this invention, which are based on cyclic organopolysiloxanes containing mesogenic groups, have glass transition temperatures and clarification temperatures which correspond approximately to those observed with similar high-molecular weight organopolysiloxanes. They can, however, be oriented in the temperature region between the glass transition temperature and the clarification temperature just as readily as mesogenic-substituted organopolysiloxanes with short chain lengths. The use of the cyclic organopolysiloxanes as the backbone for the mesogenic substituents also has the advantage, that when compared with straight-chained organopolysiloxanes having a high degree of polymerization, the choice of the mesogenic groups is less critical with respect to the chain length, and in particular the spacing of the mesogenic function from the organosiloxane backbone (spacer length) with respect to orientability. Also, the compositions of this invention have the advantage that they exhibit temperature and chemical stability.

The compositions of this invention are prepared by mixing the separate components. The ring sizes of the separate components can vary and, as previously mentioned, can contain various mesogenic groups.

An individual component exhibiting liquid-crystalline phases in accordance with this invention may be obtained, for example, from the graft reaction of mesogenic molecules with the cyclic polysiloxane backbone. Also, the component having liquid-crystalline phases may be prepared from the hydrolysis of organodichlorosilanes substituted with mesogenic groups.

A preferred method for preparing the individual components is to react cyclic organohydrogenpolysiloxanes with vinyl-substituted mesogenic molecules in the presence of a catalyst which promotes the addition of Si-bonded hydrogen to aliphatic multiple bonds.

The grafting reaction can be, but need not necessarily be carried out in solvents such as petroleum ether, benzene, toluene, tetrahydrofuran or methylene chloride.

Although, the reaction temperature is not a critical reaction parameter, it is preferred that the reaction be conducted in a temperature range of from 20° to 150° C.

The preferred ring size of the cyclic organohydrogenpolysiloxane used in this invention ranges from about 3 to 20 silicon atoms per molecule. Because of their availability, methyl groups are the preferred organic radicals on these cyclic polysiloxanes. However, other alkyl groups such as ethyl, propyl and aromatic substituents such as the phenyl radical can also be present.

It is preferred that the proportion of Si-H bonding in the starting material not exceed the number of silicon atoms, because when the Si—H content is too high, hydrogen is evolved during the graft reaction, which may make it difficult to obtain reproducable results.

The proportion of Si—H bonding and the resultant density of grafted mesogenic groups is also determined by the requirements in the application, as well as by such properties as space requirement of the mesogenic molecule or strength of the mutual interaction between the polymer backbone and the mesogenic molecules, and between neighboring mesogenic molecules.

All compounds exhibiting mesogenic properties can generally be considered mesogenic molecules, if they have a functional vinyl group for the graft reaction to the cyclic organopolysiloxane backbone.

Functional groups exhibiting mesogenic properties have previously been described in the literature; for example, in a comprehensive article by Dietrich Demus et al, "Liquid Crystals in Tables", VEB Deutscher Verlag fur Grundstoffindustrie, Leipzig, 1974.

Especially useful are derivatives of cyclohexene such as phenyl cyclohexane carboxylate, cyclohexyl phenyl ether, cyclohexylbenzenes, cyclohexyl cyclohexane carboxylate and bicyclohexyl derivatives containing vinyl groups. Also, compounds containing vinyl groups derived from stilbene, phenyl benzoate, benzylidene aniline, azobenzene, azoxybenzene, alkyl and alkoxy derivatives of biphenyl, Schiff bases and steroids such as cholesterol and cholestane should be mentioned.

Frequently, chiral structures which lack mesogenic properties themselves, i.e., are not grafted to the cyclopolysiloxane backbone, are suitable as mesogenic molecules when combined with nematogenic components, to form compositions exhibiting cholesteric phases.

There should be flexible bonding between the actual mesogenic functional group and the cyclic organopolysiloxane backbone, which is best accomplished with from 3 to 6 methylene groups as a bonding element between the siloxane backbone and the actual mesogenic functional groups.

Often it is desirable that the mesogenic molecules contain polar groups such as nitrile groups, in order to obtain a high dielectric anisotropy effect.

All catalysts for the addition of Si-bonded hydrogen to aliphatic multiple bonds, including those previously used, are useful as catalysts. Examples of suitable catalysts are finely divided metallic platinum, ruthenium or rhodium; metallic catalysts supported on carriers such as activated carbon, and compounds and complexes of these elements, e.g., $PtCl_4$, $H_2PtCl_6.6\ H_2O$, $Na_2PtCl_4.4\ H_2O$, platinum-olefin complexes, platinum-alcohol complexes, platinum-ether complexes and the like.

The compositions of this invention which exhibit liquid-crystalline phases can be used for indicating temperatures. Such applications are useful, for example, in the medical field, non-destructive material testing (heat flow method) or in the solution of testing problems in microelectronics. An important field of application is in the optical display of electrical and magnetic fields (optoelectronics). Other applications are in the field of electrographic procedures, light modulation, or, for example, as a component of polarizing film. Because of their desirable flow behavior, the compositions of this invention are particularly suitable for coating film. For this purpose it is sufficient to roll them onto the film at temperatures in the range of from the glass transition to the clarification temperature. In this process, the molecules are orientated in a high order liquid-crystalline state while they are being cooled to below the glass transition temperature.

The following examples further illustrate the present invention:

EXAMPLE 1

Grafting 4-propene-2-oxy-benzoic acid-4'-phenylphenyl ester to pentamethylcyclopentasiloxane (a) Allyl bromide is mixed with 4-hydroxybenzoic acid methylester in a dilute sodium hydroxide solution. The product is then saponified and the free acid thus obtained, is dried and converted into the corresponding acid chloride with thionyl chloride. Allyloxy benzoyl chloride is obtained ($b_{0.1}$ 113° to 155° C.).

(b) About 58.8 g of allyloxy benzoyl chloride is heated with 51 g of 4-phenylphenol in 50 g of toluene in the presence of 0.5 g of dimethylformamide for 4 hours at 80° C. A product identified as 4-propene-2-oxy-benzoic-acid-4'-phenylphenylester (I) is formed. The reaction mixture is evaporated to dryness and recrystallized from toluene. About 81 g is recovered which corresponds to a theoretical yield of about 82 percent. The melting point is 142° C.

(c) About 6.6 g of 4-propene-2-oxy-benzoic acid-4'-phenylphenylester are heated with 1.2 g of pentamethylcyclopentasiloxane in 20 g of methylene chloride in the presence of 100 ppm of platinum in the form of dicyclopentadienyl platinum dichloride for 3 hours under reflux. The methylene chloride is then stripped and the product is dried under vacuum. It has a glass transition temperature of 56° C. and passes into the isotropic state at 172° C.

EXAMPLE 2

Grafting 4-propene-2-oxy-benzoic acid-4'-phenylphenyl-ester and 4-propene-2-oxy-benzoic acid cholesterylester to pentamethylcyclopentasiloxane (a) The procedure described in Example 1 (b) for preparing 4-propene-2-oxy-benzoic acid-4'-phenylphenylester (I), is repeated except that allyloxy benzoylchloride is reacted with cholesterol in the presence of dimethylformamide. The product which is identified as 4-propene-2-oxy-benzoic acid cholesterylester (II), had a clarification point of 230° C.

(b) About 5 g of 4-propene-2-oxy-benzoic acid-4'-phenylphenylester (I), and 4.46 g of 4-propene-2-oxy-benzoic acid cholesterylester (II) are reacted with 1.82 g of pentamethylcyclopentasiloxane in accordance with the procedure described in Example 1 (c).

The resultant product has a glass transition temperature of 48° C. and passes into the isotropic state at 190° C. The cyclic organopolysiloxane having two different mesogenic groups per molecule is placed between two glass plates and heated to 140° C. When the glass plates are shifted slightly against each other, spontaneous orientation occurs, as shown by the formation of a yellow-green reflection color ($\lambda_{max}$=632 to 580 nanometers).

EXAMPLE 3

The cyclic siloxane containing the mesogenic groups of Example 2 is applied to a plastic film by means of a rubbercoated roller at a temperature of 140° C. A non-sticky film is formed which shows the yellow-green reflection color of the cholesteric-nematic phase, and retains it even after cooling to room temperature.

What is claimed is:

1. A composition having a liquid-crystalline phase containing a cyclic organopolysiloxane having at least one mesogenic group chemically bonded to the cyclic organopolysiloxane.

2. The composition of claim 1, wherein the composition contains nematic or cholesteric phases.

3. The composition of claim 1, wherein nematogenic and cholesterogenic or chiral molecules are intramolecularly chemically bonded to the cyclic organopolysiloxane.

4. A process for preparing a composition having a liquid-crystalline phase which comprises reacting a cyclic organohydrogenpolysiloxane with vinyl-substituted mesogenic molecules in about equimolar amounts, based on the siloxane hydrogen groups, in the presence of a catalyst which promotes the addition of Si-bonded hydrogen to aliphatic multiple bonds.

5. The process of claim 4, wherein the reaction is conducted in the presence of a solvent.

6. A process for coating a substrate which comprises coating a substrate with a cyclic organopolysiloxane having at least one mesogenic group chemically bonded to the cyclic organopolysiloxane and thereafter cooling the coated substrate.

7. The process of claim 6, wherein the substrate is coated at a temperature above the glass transition temperature.

* * * * *